(12) United States Patent
Zmudzinski

(10) Patent No.: US 12,321,267 B2
(45) Date of Patent: *Jun. 3, 2025

(54) HARDWARE MECHANISM TO EXTEND MKTME PROTECTIONS TO SGX DATA OUTSIDE EPC

(71) Applicant: Intel Corporation, Santa Clara, CA (US)

(72) Inventor: Krystof Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/819,862

(22) Filed: Aug. 15, 2022

(65) Prior Publication Data
US 2024/0054071 A1   Feb. 15, 2024

(51) Int. Cl.
G06F 21/60 (2013.01)
G06F 12/02 (2006.01)
G06F 12/14 (2006.01)
H04L 9/08 (2006.01)

(52) U.S. Cl.
CPC ...... *G06F 12/0284* (2013.01); *G06F 12/1408* (2013.01); *G06F 21/602* (2013.01); *H04L 9/0861* (2013.01); *G06F 2212/1052* (2013.01)

(58) Field of Classification Search
CPC .... G06F 21/556; G06F 21/78; G06F 21/6227; G06F 21/71; G06F 21/46; G06F 21/563; G06F 21/107; G06F 21/105; G06F 21/00; G06F 21/805; G06F 21/6245; G06F 21/577; G06F 21/575; G06F 21/51; G06F 21/10; G06F 21/602; G06F 21/72; G06F 21/54; G06F 21/53; G06F 21/74; G06F 21/1015; G06F 21/121; G06F 21/79; G06F 2212/452; G06F 21/57; G06F 9/30043;
(Continued)

(56) References Cited

U.S. PATENT DOCUMENTS 5,043,878 A   8/1991 Ooi
6,751,737 B1   6/2004 Russell et al.
(Continued)

FOREIGN PATENT DOCUMENTS

EP   1242869 A1   9/2002

OTHER PUBLICATIONS

Arnautov, Sergei et al., "Scone: Secure Linux Containers with Intel SGX", Proceedings of the 12th USENIX Symposium on Operating Systems Design and Implementation (OSDI '16), Nov. 2-4, 2016, pp. 689-703 (17 pages).
(Continued)

*Primary Examiner* — Djenane M Bayard
(74) *Attorney, Agent, or Firm* — Compass IP Law PC

(57) ABSTRACT

An apparatus comprises a hardware processor to define a linear address (LA) region outside an established address range for a secure enclave, generate, for the linear address (LA) region, a unique encryption key accessible only to the enclave, assign a key identifier to the unique encryption key, store the linear address (LA) region and the unique encryption key in an enclave control structure, and program the key identifier and the unique encryption key into a memory encryption circuitry.

12 Claims, 4 Drawing Sheets

(58) Field of Classification Search
CPC ............... G06F 9/5016; G06F 12/0811; G06F 12/0875; G06F 12/1458
See application file for complete search history.

(56) References Cited

U.S. PATENT DOCUMENTS

| | | | |
|---|---|---|---|
| 8,245,037 B1* | 8/2012 | Durgin | H04L 9/0894 |
| | | | 713/167 |
| 2003/0061499 A1* | 3/2003 | Durrant | G06F 21/85 |
| | | | 713/189 |
| 2009/0006796 A1* | 1/2009 | Chang | G06F 21/79 |
| | | | 713/193 |
| 2016/0371496 A1* | 12/2016 | Sell | G06F 21/52 |
| 2022/0308756 A1* | 9/2022 | Raval | G06F 3/061 |

OTHER PUBLICATIONS

Bulck, Jo Van et al., "SGX-Step: A Practical Attack Framework for Precise Enclave Execution Control", SysTEX'17: Proceedings of the 2nd Workshop on System Software for Trusted Execution, Oct. 2017, 6 pages.
Tsai, Chia-Che et al., "Graphene-SGX: A Practical Library OS for Unmodified Application on SGX", Proceedings of the 2017 USENIX Annual Technical Conference (USENIX ATC '17), Jul. 12-14, 2017, pp. 645-658 (15 pages).

* cited by examiner

HARDWARE MECHANISM TO EXTEND MKTME PROTECTIONS TO SGX DATA OUTSIDE EPC

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
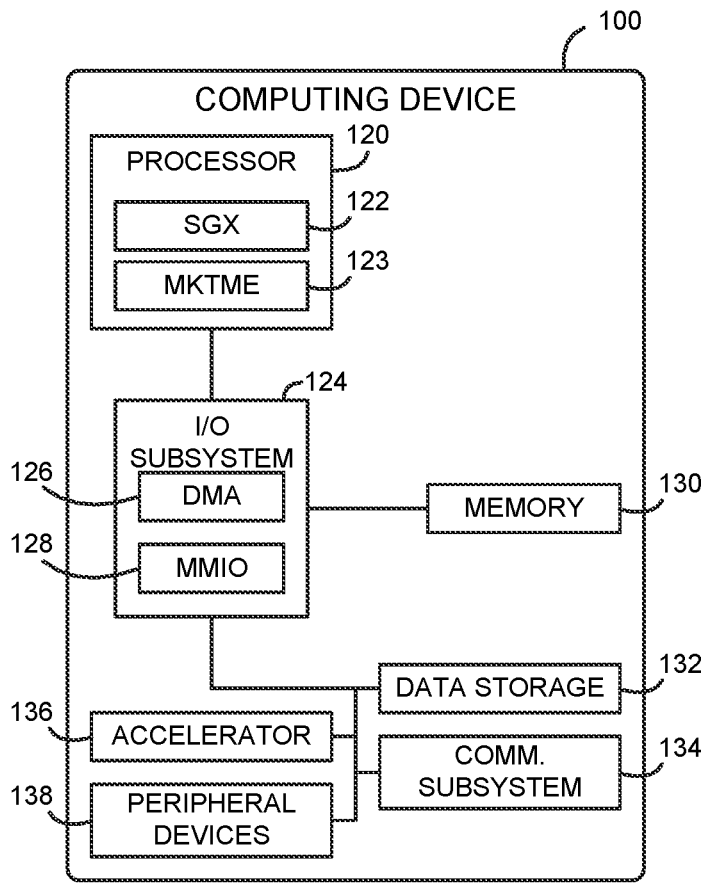
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

In some examples the processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes multi-key total memory encryption (MKTME) support 123. The MKTME 123 may encrypt data that is transmitted to the memory 130 for storage and decrypt encrypted data retrieved from the memory 130.

The MKTME support 123 allows the processor 120 to transparently encrypt the contents of the memory 130. The MKTME support 123 maintains a table or other internal, protected structure with multiple encryption keys, which are used to encrypt and decrypt data as it is stored to and read from the memory 130, respectively. The encryption keys may be implemented as 128-bit AES XTS keys although may be embodied as any symmetric, asymmetric, or other encryption key. The encryption key may be selected by the MKTME support 123 on a per-page basis, for example based on a key identifier included in one or more otherwise unused upper bits of the physical memory page address for a particular memory access. In those embodiments, an operating system, virtual memory monitor, or other supervisory component of the compute device 100 may control access to particular memory pages by configuring one or more page tables and/or extended page tables with the appropriate key identifiers. MKTME keys may be generated by the MKTME support 123, in which case they are not disclosed outside of the processor 120, or may be supplied by software. In some embodiments, the MKTME support 123 may include support for Intel Trusted Domain Extensions (TDX). With TDX, the MKTME support 123 may accept an external "domain" key, also called a "user" or "tenant" key. The processor 110 may also use a default key that is self-generated to protect memory used by MKTME and Intel SGX as well as Intel TDX.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
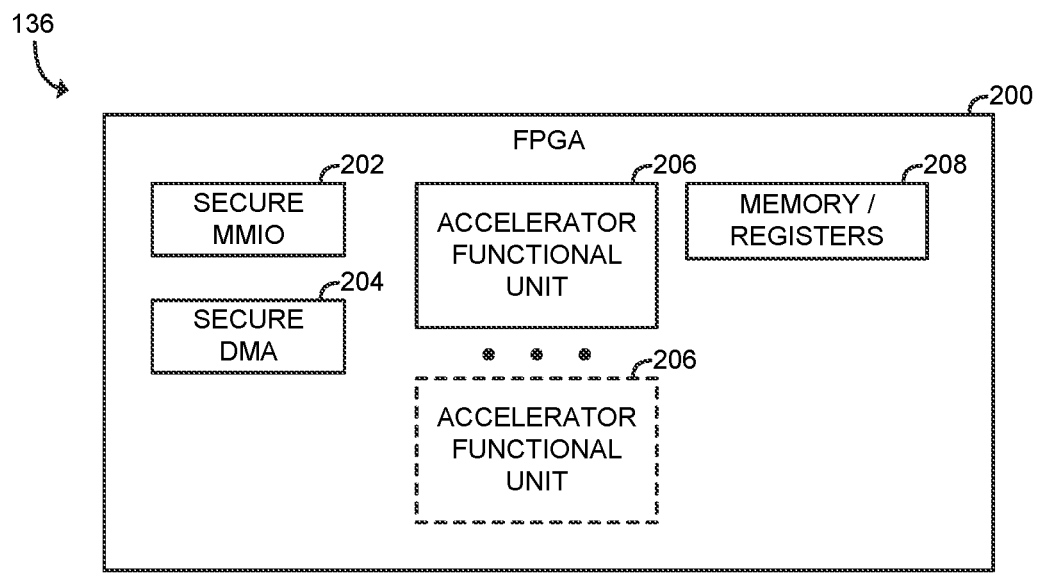
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
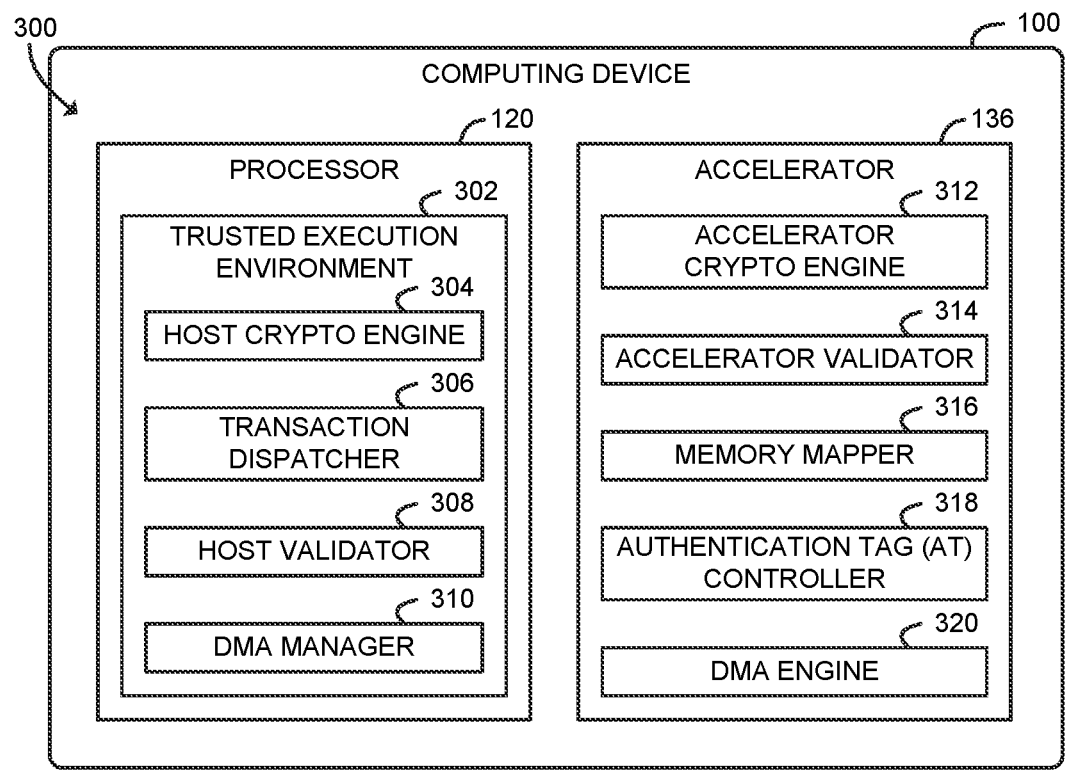
FIG. 3 is a simplified block diagram of at least one embodiment of an environment of the computing device of FIGS. 1-2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a host cryptographic engine 304, a transaction dispatcher 306, a host validator 308, and a direct memory access (DMA) manager 310. The accelerator 136 includes an accelerator cryptographic engine 312, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

As described briefly above, in existing SGX enclaves the on-chip boundary forms a natural security boundary, where data and code may be stored in plaintext and assumed to be secure. Intel® SGX does not protect I/O data that moves across the on-chip boundary. SGX enclaves that want to pass sensitive data to/from accelerators or other remote devices, for example, use software-based encryption for data transfer and the data must be stored in SGX memory such as the enclave page cache (EPC) which is a scarce resource that can't be easily resized as the needs change. In some instances, this may limit the ability of adjunct processors in an SGX enclave to manage large data sets.

Subject matter described herein address these and other issues by enabling SGX enclaves to copy data out of and into an enclave page cache to and from system memory using MKTME encryption/decryption and integrity protections transparently and without incurring costs of custom software encryption. This invention leverages multi-key total memory encryption (MKTME) technology with integrity to dynamically create protected memory regions of any size for exclusive use by the owner enclaves. In some examples a trusted domain extension input/output extension (TDXIO) may be implemented to enable memory transfers between accelerators or other devices and the extended memory regions using the same encryption key, thereby enabling SGX enclaves to use memory outside of EPC to manipulate large amounts of data using MKTME protections.

By way of overview, in some examples one or more per-logical-processor linear-address (LA) regions are defined outside the enclave linear address range(s) (EL-RANGE(s)) of SGX enclaves. These regions may be associated with encryption keys (and corresponding KEYIDs) that may be different from any keys used by SGX enclaves for their own protections. Writes to and reads from these regions by SGX enclaves are automatically encrypted and decrypted with those keys by MKTME hardware. In some examples, each SGX enclave can dynamically define which LA range outside ELRANGE should be protected in this manner. The CPU initializes the necessary hardware on each entry to an enclave and enforces the use of the correct key/KEYID combination. In some examples, the CPU adds information about these pages into the enclaves control structure (SECS), generates a unique memory encryption key for these pages, assigns an unique keyID for this key and programs the key and key ID into memory encryption engine, MKTME. Additional details are described below with reference to FIG. 4 and FIG. 5.

Figure 4:
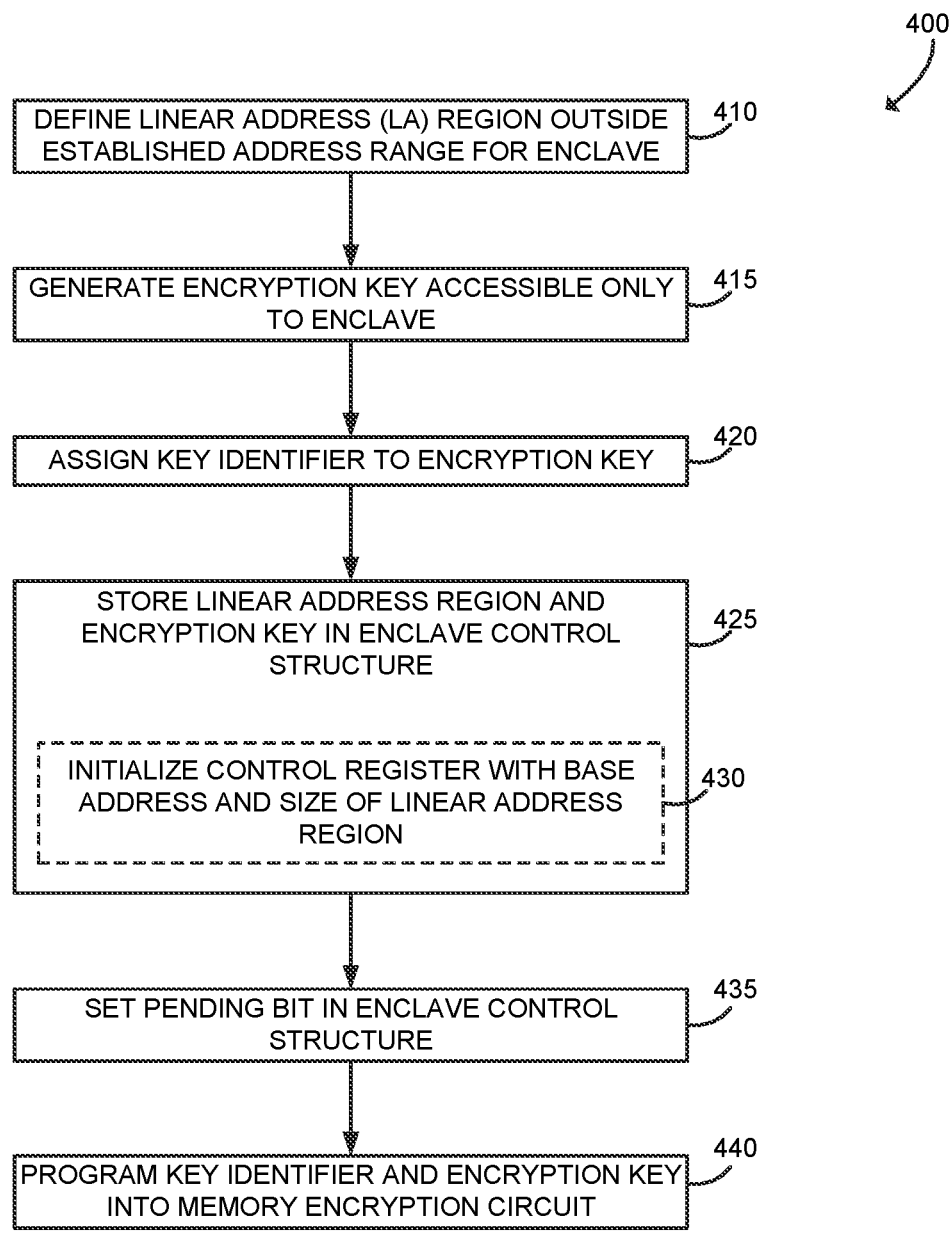
FIG. 4 is a simplified flow diagram of at least one embodiment of a method to extend MKTME protections to SGX data outside the enclave page, in accordance with some embodiments.

FIG. 4 is a simplified flow diagram of at least one embodiment of a method to extend MKTME protections to SGX data outside the enclave page, in accordance with some embodiments. It should be appreciated that, in some embodiments, the operations of the method 400 may be performed by one or more components of the environment 300 of the computing device 100 as shown in FIG. 3, such as the trusted execution environment 302. Referring now to FIG. 4, the method 400 begins in at operation 410, in which a liner address region outside the established address range for the enclave is defined. In some examples, an SGX enclave may request a range outside ELRANGE that should be protected by MKTME. In some examples, this range may be referred to as an enclave input/output linear address range (EIOLRANGE). In some examples, the enclave requests that the range be created by the OS via an outside call (OCALL) to an application that uses the enclave.

In some examples, the application then requests that the range be created by the operating system (OS), e.g., via a syscall. The operating system executes a new enclave system instruction (ENCLS) leaf function called ESETIOLRANGE, which is a leaf function of the ENCLS instruction that sets and EIOLRANGE. The operating system passes the enclave's SECS, the base and the size of the range to ESETIOLRANGE. The leaf function ESETIOLRANGE checks that the proposed LA range is outside of ELRANGE and, if so, at operation 415 the leaf function ESETIOL-RANGE generates a unique encryption key.

At operation 420 a key identifier is assigned to the encryption key generated in operation 415. In some examples, the operating system assigns a KEYID associated with the key generated by ESETIORANGE by using another ENCLS leaf function referred to herein as ESETIOKEYID, which makes sure that no other enclave uses this KEYID and sets an MKTME key ID for the EIOL-RANGE.

At operation 425, the encryption key key and the new EIOLRANGE are stored in the in secure enclave control structure (SECS). In some examples, at operation 430, a control register may be initialized with the base address and the size of the linear address region defined in operation 410. In some examples, on each EENTER or ERESUME, a new, per-logical-processor range register referred to herein as the CR_EIOLRANGE is initialized with the base and the size of the LA range of a given enclave and a new control register referred to herein as the CR_KEYID is initialized with the corresponding KEYID. The EENTER instruction is a leaf function of the ENCLU (Enclave User Instruction) that application uses to enter an enclave. The ERESUME is a leaf function of the ENCLU (Enclave User Instruction) that called by the application to resume the enclave after it was interrupted by a fault or exception. ERESUME restarts the enclave at the instruction that caused the fault or the exception (or at the place that the exception handler inside the enclave set after such an event). CR_EIOLRANGE is a micro-architectural control register inside the CPU that is not visible to software that gets initialized by EENTER or ERESUME from the data located in SECS, which in turn is programmed by ESETIOLRANGE.

At operation 435 a pending bit is set in the secure enclave control structure (SECS). In some examples the ESETIOL-RANGE instruction sets the pending bit associated with the new range to ensure that the operating system doesn't change the region without enclave's knowledge.

At operation 440 the key identifier and the encryption key are programmed into the memory encryption circuit. In some examples the ESETIOKEYID instruction programs the MKTME hardware with the KEY/KEYID pair.

Figure 5:
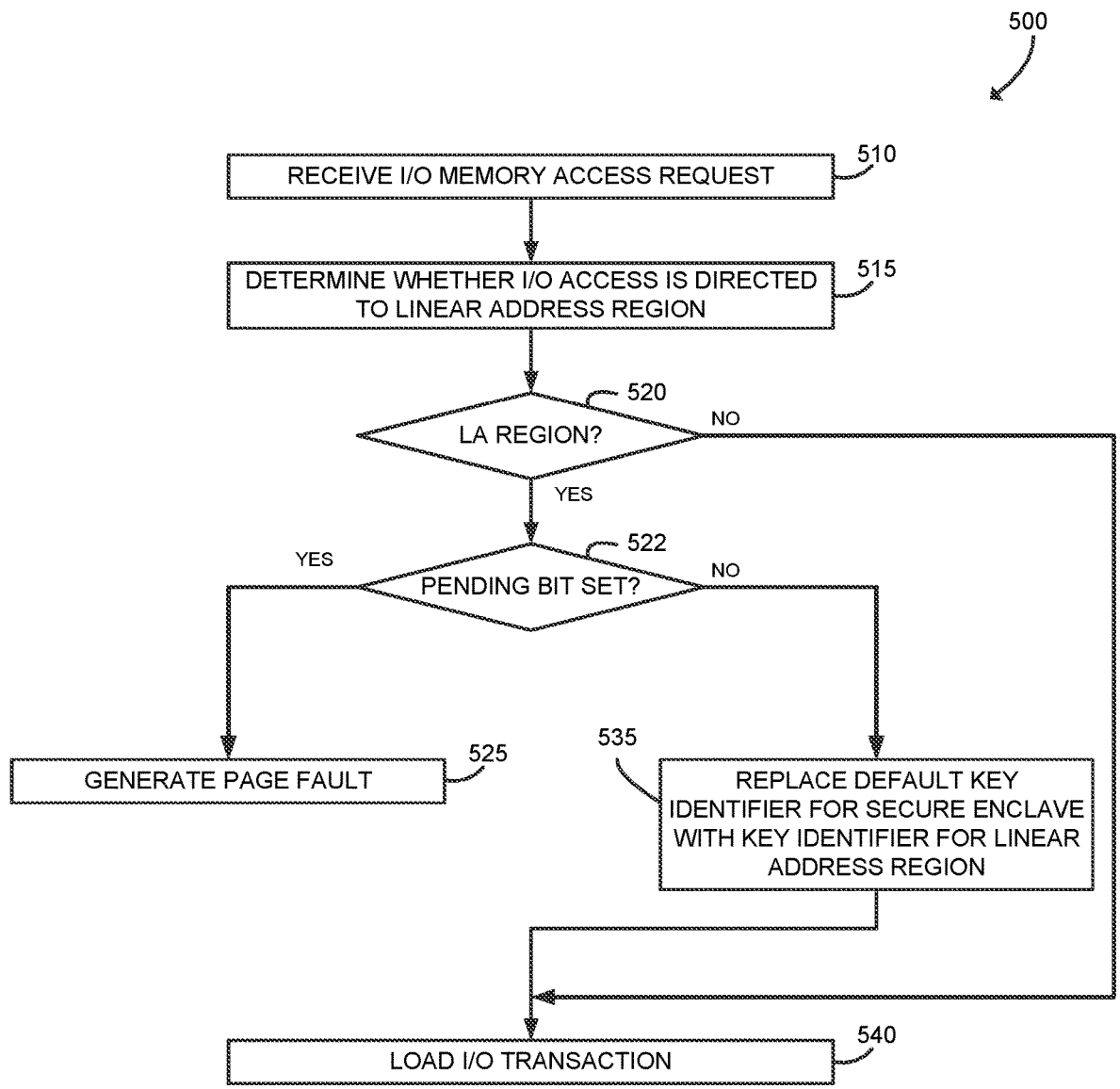
FIG. 5 is a simplified flow diagram of at least one embodiment of a method to extend MKTME protections to SGX data outside the enclave page, in accordance with some embodiments.

FIG. 5 is a simplified flow diagram of at least one embodiment of a method to extend MKTME protections to SGX data outside the enclave page, in accordance with some embodiments Referring now to FIG. 5, the method 500 begins in block 510, in which an input/output (I/O) memory access request is received. At operation 515 it is determined whether the I/O access is directed to the linear address memory region defined in operation 410. If, at operation 520, the I/O memory access is not directed to the linear address region defined in operation 410, then operation 535 is executed and the I/O memory access transaction is loaded to be executed.

By contrast, if at operation 520 the I/O memory access is directed to a linear address region then operation 522 is executed and it is determined whether the pending bit defined in operation 435 is set as described in operation 435. If, at operation 522 the pending bit is set then operation 525 is executed and a page fault is generated. By contrast, if at operation 522 the pending bit is not set then the default key identifier for the secure enclave is replaced with the key identifier for the linear address region defined in operation 410 and operation 540 the I/O transaction is loaded for execution.

In some examples the functions described above may be incorporate into an instruction set, as follows.

ESETIOLRANGE: This instruction may be called by operating system, which passes enclave's SECS, the base and the size of the IO page range to ESETIOLRANGE. In response, ESETIOLRANGE checks that the proposed LA range is outside of ELRANGE and, if so, generates a unique encryption key and stores the key and the new EIOL-RANGE in SECS. The instruction also sets a new pending bit associated with the new range to ensure that the OS doesn't change the region without enclave's knowledge; the pending bit is also located in SECS.

ESETIOKEYID: This instruction may be called by the operating system. It assigns a KEYID associated with the key generated by ESETIOLRANGE, which makes sure that no other enclave uses this KEYID. ESETIOKEYID also programs the MKTME hardware with the KEY/KEYID pair.

ECLEARIOKEYID: This instruction may be executed by the operating system to reclaim a KEYID and assign it to another enclave.

EGETIOLRANGE: This instruction allows the enclave to discover what linear address range was created by the operating system. EGETIOLRANGE also clears the pending bit associated with the new range.

Illustrative examples of the technologies disclosed herein are provided below. An embodiment of the technologies may include any one or more, and any combination of, the examples described below.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a hardware processor to define a linear address (LA) region outside an established address range for a secure enclave; generate, for the linear address (LA) region, a unique encryption key accessible only to the enclave; assign a key identifier to the unique encryption key; store the linear address (LA) region and the unique encryption key in an enclave control structure; and program the key identifier and the unique encryption key into a memory encryption circuitry.

Example 2 includes the subject matter of Example 1, wherein the unique encryption key for the linear address region is different from any encryption keys used to protect addresses within the secure enclave.

Example 3 includes the subject matter of Examples 1 and 2, the processor to set a pending bit in the enclave control structure to a value to indicate that contents of the linear address region cannot be changed without approval from the secure enclave.

Example 4 includes the subject matter of Examples 1-3, the processor to initialize a control register with a base address of the linear address (LA) region and a size of the linear address range.

Example 5 includes the subject matter of Examples 1-4, the processor to determine, in response to a transaction lookaside buffer (TLB) miss generated by an input/output (I/O) access, whether the input/output (I/O) access is directed to the linear address (LA) region outside an established address range for a secure enclave.

Example 6 includes the subject matter of Examples 1-5, the hardware processor to generate a page fault in response to a determination that the pending bit is set to a value to indicate that contents of the linear address region cannot be changed without approval from the secure enclave.

Example 7 includes the subject matter of Examples 1-6, the hardware processor to replace a default key identifier associated with the secure enclave with the key identifier in response to a determination that the pending bit is not set to a value to indicate that contents of the linear address region cannot be changed without approval from the secure enclave.

Some embodiments pertain to Example 8 that includes a processor implemented method comprising defining a linear address (LA) region outside an established address range for a secure enclave; generating, for the linear address (LA) region, a unique encryption key accessible only to the enclave; assign a key identifier to the unique encryption key; store the linear address (LA) region and the unique encryption key in an enclave control structure; and program the key identifier and the unique encryption key into a memory encryption circuitry.

Example 9 includes the subject matter of Example 8, wherein the unique encryption key for the linear address region is different from any encryption keys used to protect addresses within the secure enclave.

Example 10 includes the subject matter of Examples 8 and 9, includes the subject matter of Examples 8-10, further comprising setting a pending bit in the enclave control structure to a value to indicate that contents of the linear address region cannot be changed without approval from the secure enclave.

Example 11 includes the subject matter of Examples 8-10, further comprising initializing a control register with a base address of the linear address (LA) region and a size of the linear address range.

Example 12 includes the subject matter of Examples 8-11, further comprising determining, in response to a transaction lookaside buffer (TLB) miss generated by an input/output (I/O) access, whether the input/output (I/O) access is directed to the linear address (LA) region outside an established address range for a secure enclave.

Example 13 includes the subject matter of Examples 8-12, further comprising generating a page fault in response to a determination that the pending bit is set to a value to indicate that contents of the linear address region cannot be changed without approval from the secure enclave.

Example 14 includes the subject matter of Examples 8-13, further comprising replacing a default key identifier associated with the secure enclave with the key identifier in response to a determination that the pending bit is not set to a value to indicate that contents of the linear address region cannot be changed without approval from the secure enclave.

Some embodiments pertain to Example 15, that includes at least one non-transitory computer readable medium having instructions stored thereon, which when executed by a processor, cause the processor to define a linear address (LA) region outside an established address range for a secure enclave; generate, for the linear address (LA) region, a unique encryption key accessible only to the enclave; assign a key identifier to the unique encryption key; store the linear address (LA) region and the unique encryption key in an enclave control structure; and program the key identifier and the unique encryption key into a memory encryption circuitry.

Example 16 includes the subject matter of Example 15, further comprising instruction which, when executed by processor, cause the processor to set a pending bit in the enclave control structure to a value to indicate that contents of the linear address region cannot be changed without approval from the secure enclave.

Example 17 includes the subject matter of Examples 15 and 16, further comprising instruction which, when executed by processor, cause the processor to initialize a control register with a base address of the linear address (LA) region and a size of the linear address range.

Example 18 includes the subject matter of Examples 15-17, further comprising instruction which, when executed by processor, cause the processor to.

Example 19 includes the subject matter of Examples 15-18, further comprising instruction which, when executed by processor, Example 20 includes the subject matter of Examples 15-19, further comprising instructions stored thereon that, in response to being executed, cause the computing device to generate a page fault in response to a determination that the pending bit is set to a value to indicate that contents of the linear address region cannot be changed without approval from the secure enclave.

Example 21 includes the subject matter of Examples 15-20, further comprising instructions stored thereon that, in response to being executed, cause the computing device to replace a default key identifier associated with the secure enclave with the key identifier in response to a determination that the pending bit is not set to a value to indicate that contents of the linear address region cannot be changed without approval from the secure enclave.

The details above have been provided with reference to specific embodiments. Persons skilled in the art, however, will understand that various modifications and changes may be made thereto without departing from the broader spirit and scope of any of the embodiments as set forth in the appended claims. The foregoing description and drawings are, accordingly, to be regarded in an illustrative rather than a restrictive sense.

What is claimed is:

1. An apparatus, comprising:
   a hardware processor to:
   define a linear address region outside an established address range for a secure enclave established via execution of a set of processor instructions, wherein both code to be executed by the hardware processor and data included in the secure enclave are protected from being accessed by executing code not included in the secure enclave;
   generate, for the linear address region, a unique encryption key accessible only to the secure enclave;
   assign a key identifier to the unique encryption key;
   store the linear address region and the unique encryption key in an enclave control structure;
   program the key identifier and the unique encryption key into a memory encryption circuitry;
   determine, in response to a transaction lookaside buffer miss generated by an input/output access, whether the input/output access is directed to the linear address region outside an established address range for the secure enclave; and
   replace a default key identifier associated with the secure enclave with the key identifier in response to a determination that the pending bit is not set to a value to indicate that contents of the linear address region cannot be changed without approval from the secure enclave.

2. The apparatus of claim 1, wherein the unique encryption key for the linear address region is different from any encryption keys used to protect addresses within the secure enclave.

3. The apparatus of claim 1, the hardware processor to:
   set a pending bit in the enclave control structure to a value to indicate that contents of the linear address region cannot be changed without approval from the secure enclave.

4. The apparatus of claim 3, the hardware processor to:
   initialize a control register with a base address of the linear address region and a size of the linear address range.

5. A method, comprising:
   defining a linear address region outside an established address range for a secure enclave established via execution of a set of processor instructions by a hardware processor, wherein both code to be executed by the hardware processor and data included in the secure enclave are protected from being accessed by executing code not included in the secure enclave;
   generating, for the linear address region, a unique encryption key accessible only to the enclave;
   assigning a key identifier to the unique encryption key;
   storing the linear address region and the unique encryption key in an enclave control structure;
   programming the key identifier and the unique encryption key into a memory encryption circuitry;
   determining, in response to a transaction lookaside buffer miss generated by an input/output access, whether the input/output access is directed to the linear address region outside an established address range for the secure enclave; and
   replacing a default key identifier associated with the secure enclave with the key identifier in response to a determination that the pending bit is not set to a value to indicate that contents of the linear address region cannot be changed without approval from the secure enclave.

6. The method of claim 5, wherein the unique encryption key for the linear address region is different from any encryption keys used to protect addresses within the secure enclave.

7. The method of claim 5, further comprising:
   setting a pending bit in the enclave control structure to a value to indicate that contents of the linear address region cannot be changed without approval from the secure enclave.

8. The method of claim 7, further comprising:
   initializing a control register with a base address of the linear address region and a size of the linear address range.

9. One or more non-transitory computer-readable storage media comprising instructions stored thereon that, in response to being executed, cause a computing device to:

define a linear address region outside an established address range for a secure enclave established via execution of a set of processor instructions by a hardware processor, wherein both code to be executed by the hardware processor and data included in the secure enclave are protected from being accessed by executing code not included in the secure enclave;

generate, for the linear address region, a unique encryption key accessible only to the enclave;

assign a key identifier to the unique encryption key;

store the linear address region and the unique encryption key in an enclave control structure;

program the key identifier and the unique encryption key into a memory encryption circuitry;

determine, in response to a transaction lookaside buffer miss generated by an input/output access, whether the input/output access is directed to the linear address region outside an established address range for the secure enclave; and replace a default key identifier associated with the secure enclave with the key identifier in response to a determination that the pending bit is not set to a value to indicate that contents of the linear address region cannot be changed without approval from the secure enclave.

10. The one or more non-transitory computer-readable storage media of claim 9, wherein the unique encryption key for the linear address region is different from any encryption keys used to protect addresses within the secure enclave.

11. The one or more non-transitory computer-readable storage media of claim 9, further comprising instructions stored thereon that, in response to being executed, cause the computing device to:

set a pending bit in the enclave control structure to a value to indicate that contents of the linear address region cannot be changed without approval from the secure enclave.

12. The one or more non-transitory computer-readable storage media of claim 11, further comprising instructions stored thereon that, in response to being executed, cause the computing device to:

initialize a control register with a base address of the linear address region and a size of the linear address range.

* * * * *